(12) United States Patent
Ng (10) Patent No.: US 6,388,591 B1
(45) Date of Patent: May 14, 2002

(54) APPARATUS AND METHOD FOR RECEIVING DATA SERIALLY FOR USE WITH AN ADVANCED TECHNOLOGY ATTACHMENT PACKET INTERFACE (ATAPI)

(75) Inventor: Alan K. Ng, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/405,694

(22) Filed: Sep. 24, 1999

(51) Int. Cl.[7] .............................................. H03M 9/00
(52) U.S. Cl. ........................ 341/100; 341/101; 710/71; 710/52; 710/60; 320/364; 320/365; 320/366
(58) Field of Search ................................. 341/100, 101; 395/828, 680; 710/22, 25, 35, 71, 52, 60; 370/364, 365, 366

(56) References Cited

U.S. PATENT DOCUMENTS

| | | | |
|---|---|---|---|
| 4,023,144 A | * 5/1977 | Koening | 341/101 |
| 4,486,739 A | 12/1984 | Franaszek et al. | 340/347 |
| 5,134,702 A | * 7/1992 | Charych et al. | 710/71 |
| 5,247,652 A | * 9/1993 | Uda | 710/71 |
| 5,485,488 A | 1/1996 | Van Brunt et al. | 375/257 |
| 5,968,147 A | * 10/1999 | Polfer et al. | 710/52 |
| 6,121,906 A | * 9/2000 | Kim | 341/100 |

* cited by examiner

Primary Examiner—Peguy Jeanpierre
Assistant Examiner—Lam T. Mai
(74) Attorney, Agent, or Firm—Pennie & Edmonds LLP (57) ABSTRACT

A receiver interface for interfacing with an Advanced Technology Attachment Packet Interface (ATAPI) in a first device. The receiver interface includes a converter, a depacketizing circuit, and an ATAPI receiver circuit. The converter converts a first set of signals from a serial bus into a second set of signals. The first set of signals are serial to one another and use low-voltage, differential signaling (LVDS). The first set of signals are adapted to be received on fewer lines and at a faster data rate than possible with an Integrated Disc Electronics (IDE) bus. In contrast, the second set of signals are serial to another and use TTL voltage levels and single-ended signaling. Additionally, the second set of signals use a packet format to represent a packet. The depacketizing circuit disassembles the packet represented by the second set of signals to generate a third set of signals, which are parallel to one another and use TTL, single-ended signaling. The third set of signals represents a payload of the packet. The ATAPI receiver circuit stores a fourth set of signals at a location within the ATAPI in response to the third set of signals. The fourth set of signals representing a portion of the payload of the packet.

28 Claims, 8 Drawing Sheets

FIG. 1

(Prior Art)

APPARATUS AND METHOD FOR RECEIVING DATA SERIALLY FOR USE WITH AN ADVANCED TECHNOLOGY ATTACHMENT PACKET INTERFACE (ATAPI)

The present invention relates generally to a receiver interface, and particularly to a receiver interface for a non-industry standard bus that is compatible with AT Attachment Packet Interface's Task File.

BACKGROUND OF THE INVENTION

Figure 1:
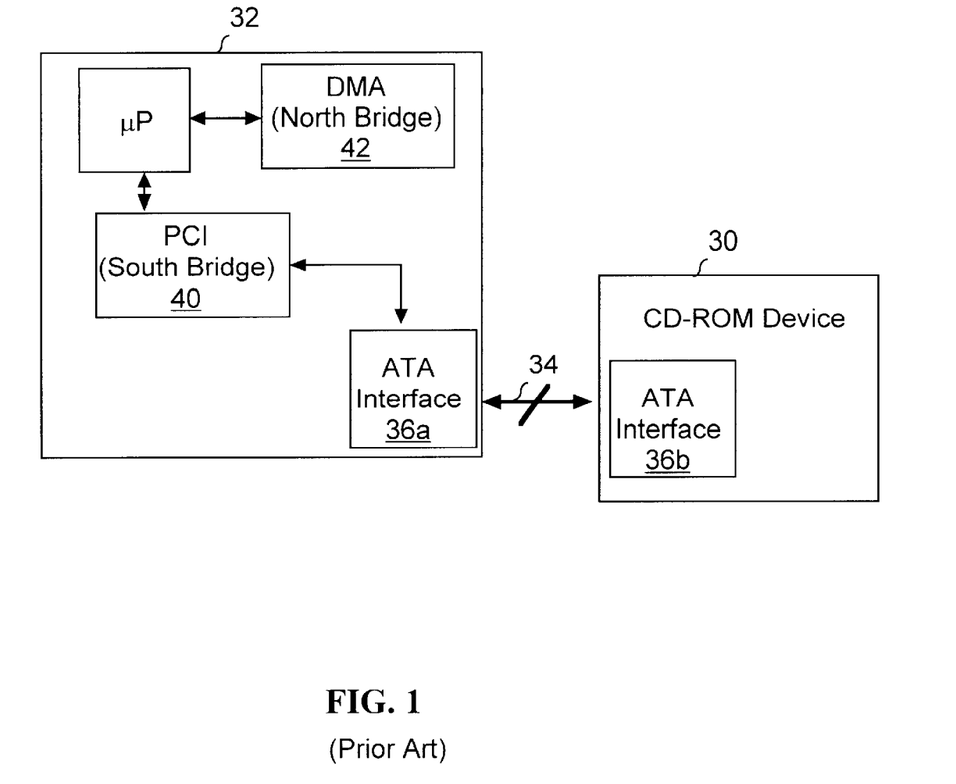
FIG. 1 is a block diagram of a prior art personal computer connected to a peripheral device by an IDE bus.

Satisfying the apparently insatiable demand for ever-increasing microprocessor clock rates presents a challenge to designers of Compact Disc Read-Only-Memory (CD-ROM) devices. FIG. 1 illustrates the cause of this challenge, showing a CD-ROM Device 30 connected to a personal computer (PC) 32 via an Integrated Disc Electronics (IDE) Bus 34. Consisting of 40 wires, IDE Bus 34 has a maximum clock rate of 66 MHZ and supports up to 32 bits of parallel data. IDE Bus 34 transports single-ended, parallel signals that use Transistor-to-Transistor Logic (TTL) voltage level signaling. In other words, each line, or wire, of IDE Bus 34 carries a single signal that represents a digital "1" via a voltage level of approximately 5 volts and a digital "0" via a voltage level of approximately 0 volts.

AT Attachment (ATA) Interface 36a enables PC 32 to support CD-ROM players. ATA Interface 36a is coupled to the microprocessor's local bus, a peripheral Component Interconnect (PCI) Bus 40. The maximum clock rate of IDE Bus 34 is limited by that of PCI 40; i.e., 66 MHZ. This clock rate is not adequate to enable PC 32 to simultaneously play music and video stored on a CD-ROM. Thus, the demand for speed militates that data transfer rates between CD-ROM player 30 at least equal, if not exceed, the clock rate of PCI 40.

One solution is to increase the width of the data path between PC 32 and CD-ROM Device 30, i.e., increasing the number of lines of IDE Bus 34. A transfer rate of greater than 66 MHZ could be achieved by doubling the number of wires of IDE Bus 34 from 40 to 80; however, such a large pin/wire count is unlikely to gain wide acceptance. Another approach to achieving higher clock and data transfer rates would be to couple CD-ROM Device 30 to Direct Memory Access (DMA) Interface 42, rather than PCI 40. Increasing the data transfer rate in this manner comes at the cost of backward compatibility with devices using ATA Interface 36. Thus, a need exists for an interface that supports data transfer rates greater than that possible with the IDE Bus 34, is compatible with the ATA Interface and uses no more than the number of wires of IDE Bus 34.

No technology currently available entirely satisfies this need. IEEE Standard 1394 defines a high speed, isochronous, external bus for personal computers. Sometimes called a "Fire Wire" because of its speed, the 1394 bus is not widely used, despite its speed and flexibility, because of its expense.

AT Attachment Packet Interface (ATAPI) for CD-ROMs is an extension of the ATA Interface that supports connection of CD-ROM players and tape players to personal computers. The ATAPI Standard (SFF-8020i) defines a Task File, a set of registers used by the peripheral devices and personal computer, used to transfer data. According to ATAPI, commands are communicated using packets. Generally described, a packet is a portion of a message, which may include many packets. Typically, each packet includes destination information and data, or a payload. A packet may also include a packet ID (PID) and a cyclical redundancy check (CRC). Because each packet of a message includes a PID, packets need not be transmitted in order to successfully reconstruct the message. Many protocols using packets support isochronous data transfer, as opposed to synchronous data transfer. Isochronous data transfer enables video data to be transmitted as quickly as it is displayed and generally supports very high data transfer rates. However, devices using ATAPI also typically use the IDE Bus, thereby limiting the maximum data transfer rate below the theoretical maximum rate.

Low Voltage Differential Signaling (LVDS) is an alternative to standard signaling, which uses TTL voltage levels and is single-ended. LVDS data transmission is less susceptible to common-mode noise than a single-ended scheme because two wires with opposite current/voltage swings are used instead of a single wire. Because of the reduced noise concerns, low voltage level swings can be used thereby reducing power consumption and allowing faster switching rates. However, merely replacing each single-ended wire of the IDE bus with two LVDS wires is unacceptable because of the increased wire count of the resultant bus as compared to the IDE bus.

SUMMARY OF THE INVENTION

The present invention is a receiver interface compatible with the ATA Interface and the AT Attachment Packet Interface (ATAPI) that achieves transfer rates greater than those possible with the IDE bus by using a serial bus having fewer lines than an IDE Bus. The receiver interface includes a converter, a depacketizing circuit, and an ATAPI receiver circuit. The converter converts a first set of signals from a serial bus into a second set of signals. The first set of signals are serial to one another and use low-voltage, differential signaling (LVDS). The first set of signals are adapted to be received on fewer lines and at a faster data rate than possible with an Integrated Disc Electronics (IDE) bus. In contrast, the second set of signals are serial to another and use TTL voltage levels and single-ended signaling. Additionally, the second set of signals use a packet format to represent a packet. The depacketizing circuit disassembles the packet represented by the second set of signals to generate a third set of signals, which are parallel to one another and use TTL, single-ended signaling. The third set of signals represents a payload of the packet. The ATAPI receiver circuit stores a fourth set of signals at a location within the ATAPI in response to the third set of signals. The fourth set of signals representing a portion of the payload of the packet.

BRIEF DESCRIPTION OF THE DRAWINGS

Additional objects and features of the invention will be more readily apparent from the following detailed description and appended claims when taken in conjunction with the drawings, in which:

DESCRIPTION OF THE INVENTION

Figure 2:
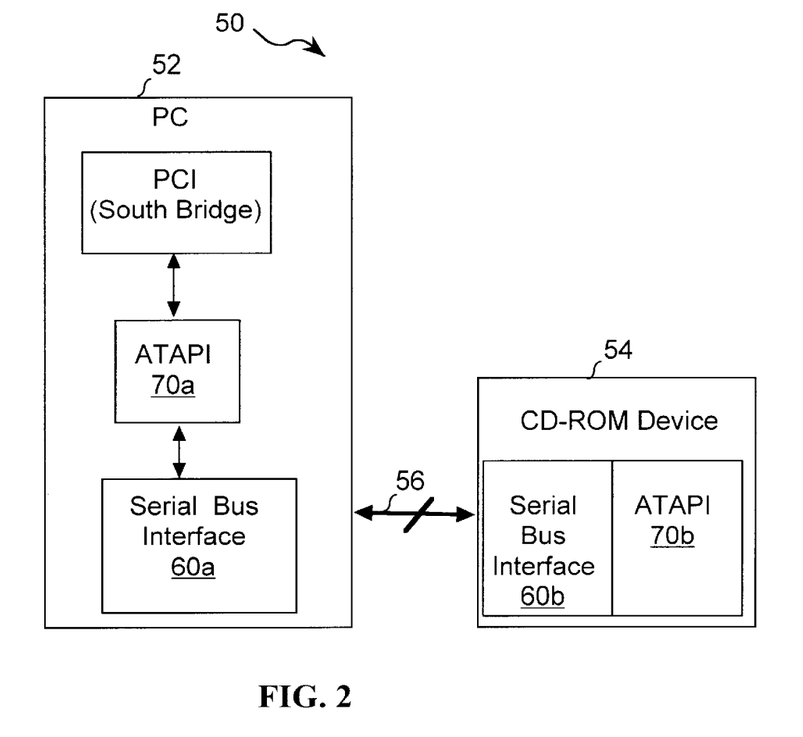
FIG. 2 is a block diagram of a personal computer system including a Serial Bus Interface.

FIG. 2 illustrates in block diagram form computer system 50 that is compatible with the ATA Interface yet achieves data transfer rates in excess of those possible with the IDE Bus. Transfer rates of up to approximately 100 Mbytes/sec between Personal Computer 52 and CD-ROM Device 54 are achieved using Serial Bus 56 and Serial Bus Interfaces 60a and 60b. Each Serial Bus Interface 60a and 60b includes Serial Receiver 64 of the present invention, which will be described in detail with respect to FIGS. 8–11.

A. Overview of The Bus and The Serial Bus Interface

Both PC 52 and CD-ROM Device 54 include an instance of Serial Bus Interface 60 and an instance of ATAPI 70. Serial Bus Interface 60 converts between data formats used by ATAPI 70 and Serial Bus 56. Serial Bus 56 includes fewer wires than an IDE Bus and achieves a superior data transfer rate. Serial Bus Interface 60 makes this reduced wire count possible by converting the parallel data stored within ATAPI 70 into serial data for transmission by Serial Bus 56. Serial bit transmission makes differential signaling on Serial Bus 56 feasible because the resulting total number of wires is still less than that of an IDE Bus. For example, in one embodiment Serial Bus 56 carries just two bits at a time, a receive (RX) bit and a transmit (TX) bit. Using differential signaling to represent two bits requires just four wires. In one embodiment, Serial Bus 56 includes 3 twisted pair cables, the additional twisted pair being used for ground and power. The transfer rate of Serial Bus 56 is further improved by the use of low voltage levels, rather than TTL voltage levels. Signals on Serial Bus 56 switch between a high level of approximately 450 mV and a low level of approximately 100 mV. This small voltage swing supports higher switching rates than are possible with TTL voltage levels. Consequently, Serial Bus 56 can achieve a higher transfer rate than an IDE Bus even though Serial Bus 56 transmits bits serially, rather than parallel.

Figure 3:
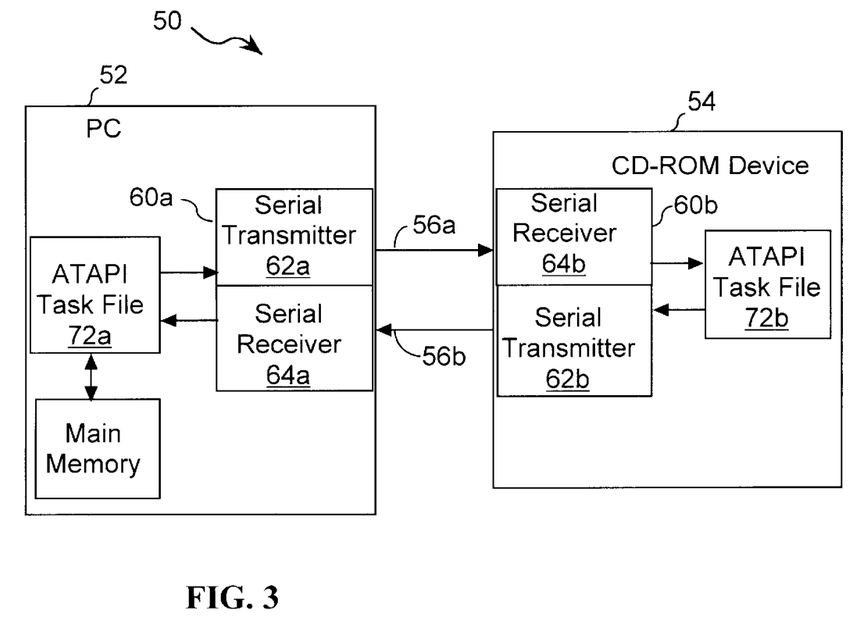
FIG. 3 is a block diagram of the personal computer system including a Serial Bus Interface in greater detail.

FIG. 3 illustrates selected features of computer system 50 in greater detail. Each instance 60a and 60b of Serial Bus Interface 60 includes a Serial Transmitter 62 and a Serial Receiver 64. Each Serial Transmitter 62 monitors its associated ATAPI Task File (Task File) 72 for any change in content. In response to a change in content, Serial Transmitter 62 generates a packet, or packets, to represent that change. Serial Transmitter 62 then converts the packet, or packets, from a set of single-ended, parallel signals using TTL voltage level signaling into a set of serial signals using LVDS. Serial Transmitter 62 then couples the set of signals to Serial Bus 56. In particular, Serial Transmitter 62a within PC 52 is coupled to Serial Receiver 64b of CD-ROM Drive 54 via wire pair 56a of Serial Bus 56. Analogously, Serial Transmitter 62b of CD-ROM Drive 54 is coupled to Serial Receiver 64a of PC 52 via wire pair 56b of Serial Bus 56.

Each Serial Receiver 64 receives from a wire pair serial, LVDS signals representing a packet, or packets. Serial Receiver 64 converts these serial, LVDS signals into parallel signals using single-ended, TTL voltage level signaling, which also represent a packet or packets. Serial Receiver 64 then disassembles each packet to access the packet's header and payload and determine the payload type. Serial Receiver 64 uses the payload type to determine in which register of Task File 72 the payload should be stored and places the payload in that register.

B. The Serial Transmitter

Figure 4:
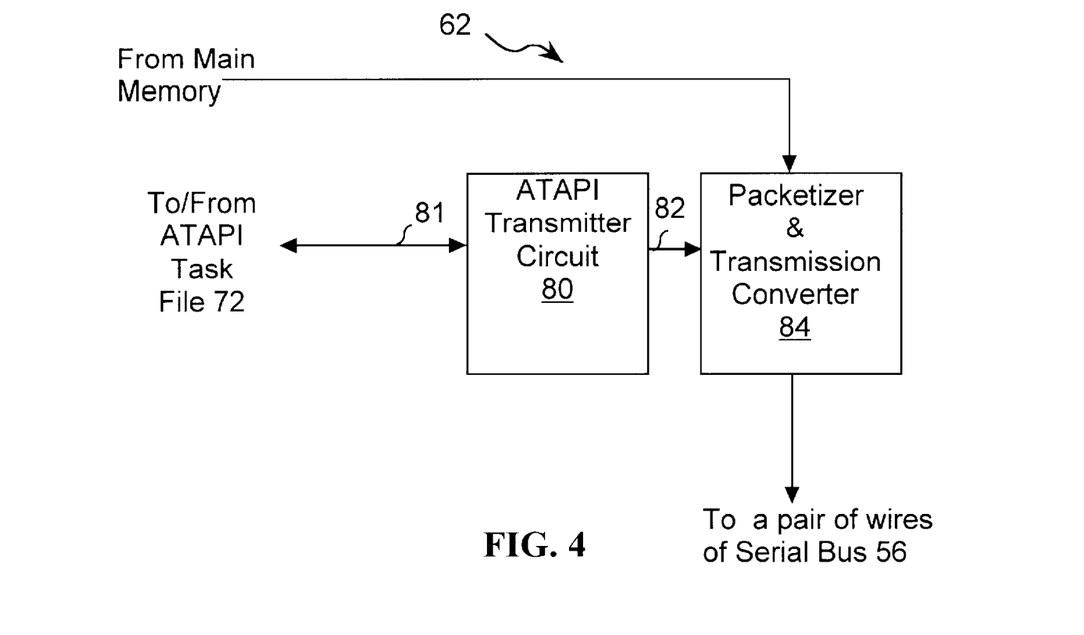
FIG. 4 is a block diagram of a Serial Transmitter of the Serial Bus Interface.

FIG. 4 illustrates in block diagram form an instance of Serial Transmitter 62, which includes ATAPI Transmitter Circuit 80 and Packetizer & Transmission Converter (P&T Converter) 84. ATAPI Transmitter Circuit 80 monitors the contents of Task File 72 via line 81. In response to a change in the contents of any of the registers of Task File 72, ATAPI Transmitter Circuit 80 generates a first set of signals representing that change in content. This first set of signals is parallel to one another and uses single-ended, TTL voltage level signaling. ATAPI Transmitter Circuit 80 transmits the first set of signals to P &T Converter 84 via line 82. P& T Converter 82 generates a packet or packets in response to the first set of signals. A second set of signals represents the packet(s) using a set of parallel, single-ended, low-voltage, differential signals. P& T Converter 82 then converts the second set of signals into a third set of signals suitable for transmission by Serial Bus 56. In other words, P& T Converter 82 converts the second set of signals to a set of serial, differential signals using low voltage levels.

B1. The ATAPI Transmitter Circuit

Figure 5:
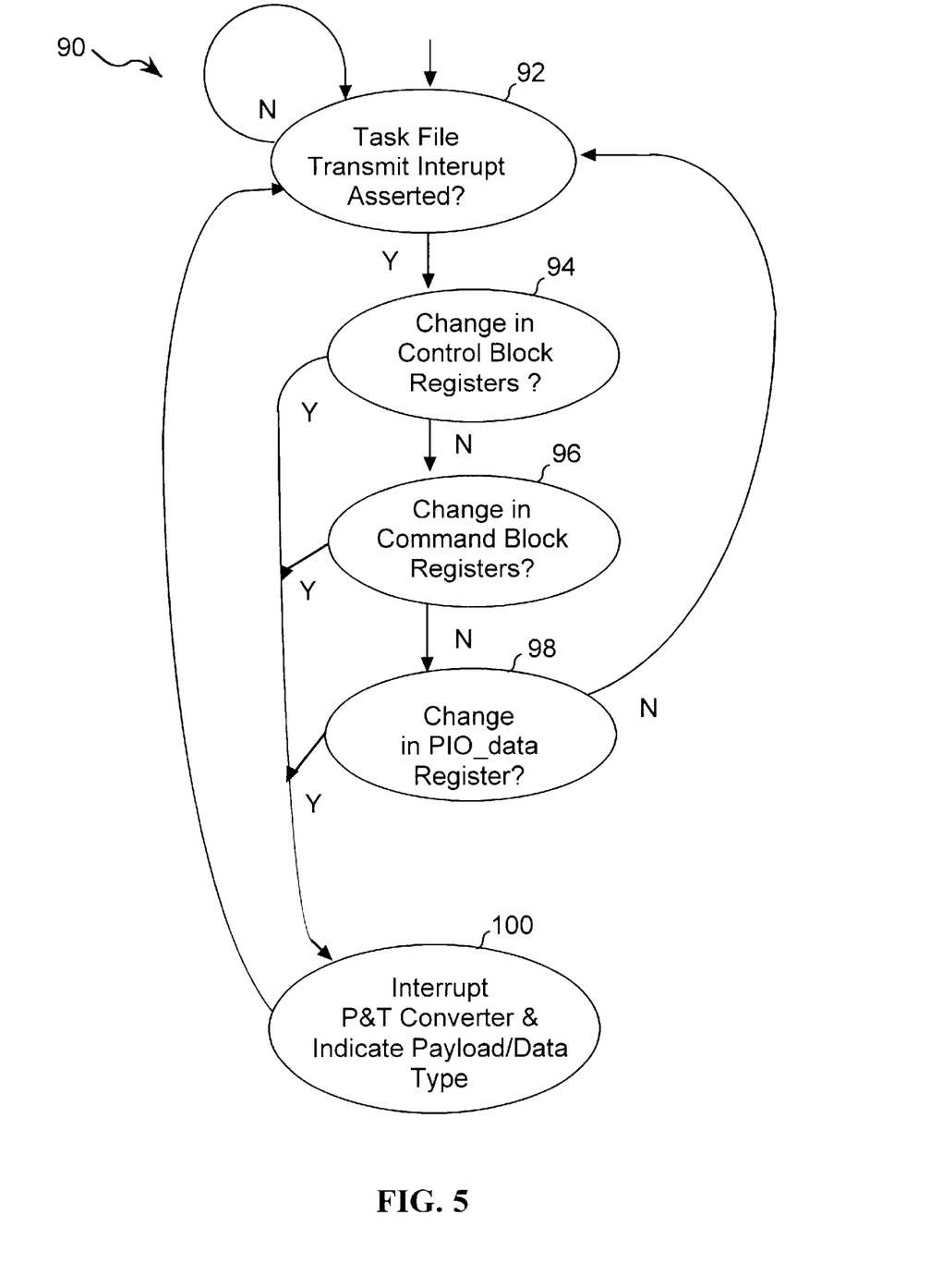
FIG. 5 is a state diagram of the ATAPI Transmit State Machine of the Serial Transmitter.

Preferably, ATAPI Transmitter Circuit 80 is realized as a state machine, referred to herein as ATAPI Transmitter State (ATS) Machine 80. ATS Machine 83 may be realized as a memory device or Programmable Logic Array (PLA) storing a number of States 90. FIG. 5 illustrates the States 90 of ATS Machine 83. Operation begins with State 92, during which ATS Machine 83 determines whether data is available for transmission to CD-ROM Drive. ATS Machine 83 makes this determination by examining a Task File Transmit (TX) Interrupt bit associated with Task File 72. Once the TX Interrupt bit is asserted, ATS Machine 83 branches from State 90 to State 92 to begin the process of identifying the transmission data. During State 92 ATS Machine 83 examines the contents of Control Block Registers of Task File 72. In response to a change in contents, ATS Machine 83 branches to State 100 from State 94. On the other hand, if no change has occurred in the contents of the Control Block Registers, ATS Machine 83 branches to State 96 from State 94. During State 96 ATS Machine 83 examines the contents of the Command Block Registers of Task File 72. In response to a change in the contents of the Command Block Registers, ATS Machine 83 advances to State 100. If, on the other hand, there has been no change in the contents of the Command Block Registers then ATS Machine 83 branches to State 98. During State 98 ATS Machine 83 examines the contents of PIO_data Registers of Task File 72 for any change in content. If there has been a change, ATS Machine 83 advances to State 100.

ATS Machine 83 reaches State 100 whenever there is data to be transmitted. First, ATS Machine 83 indicates its desire to transmit data by asserting an interrupt signal coupled to its associated P&T Converter 84. During State 100 ATS Machine 83 also indicates the type of data to be transmitted based upon which Task File Register has a change in content. That done, ATS Machine 83 returns to State 92 to begin the process over again.

B2. The P&T Converter

Figure 6:
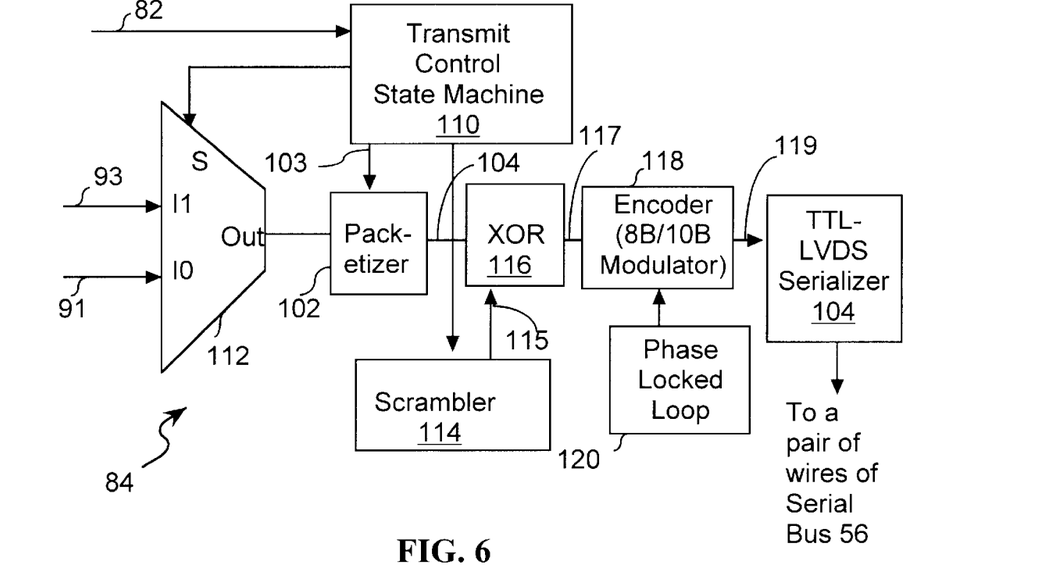
FIG. 6 is a block diagram of the Packetizer & Transmission Converter of the Serial Transmitter.

FIG. 6 illustrates in block diagram form P&T Converter 84, which includes Packetizer 102 and TTL-LVDS Serializer 104. Many circuits within P&T Converter 84 are not necessary to practice the present invention, but are required to comply with standards set by the Federal Communications Commission (FCC). Such circuits include Scrambler 114, Logical XOR 116, Encoder 118 and Phase Locked Loop (PLL) 120. Scrambler 114 and Logical XOR 116 cooperate to produce scrambled packets from the packets produced by Packetizer 102. Encoder 118 encodes the scrambled packets to produce encoded, scrambled packets, which are represented by a set of parallel, single-ended signals using TTL voltage levels. TTL-LVDS Serializer 104 converts the signals it receives from Encoder 118 into a set of serial, differential signals using low voltage levels, which still represent encoded, scrambled packets. The output of TTL-LVDS Serializer 104 is then coupled to Serial Bus 56.

Transmit Control State Machine 110 controls and coordinates the creation and transmission of packets. This consists of two major tasks. First, Transmit Control State Machine 110 negotiates set-up with the Receive Control State Machine on the opposite end of Serial Bus 56. Second, Transmit Control State Machine 110 controls the process of generating packets.

Figure 7:
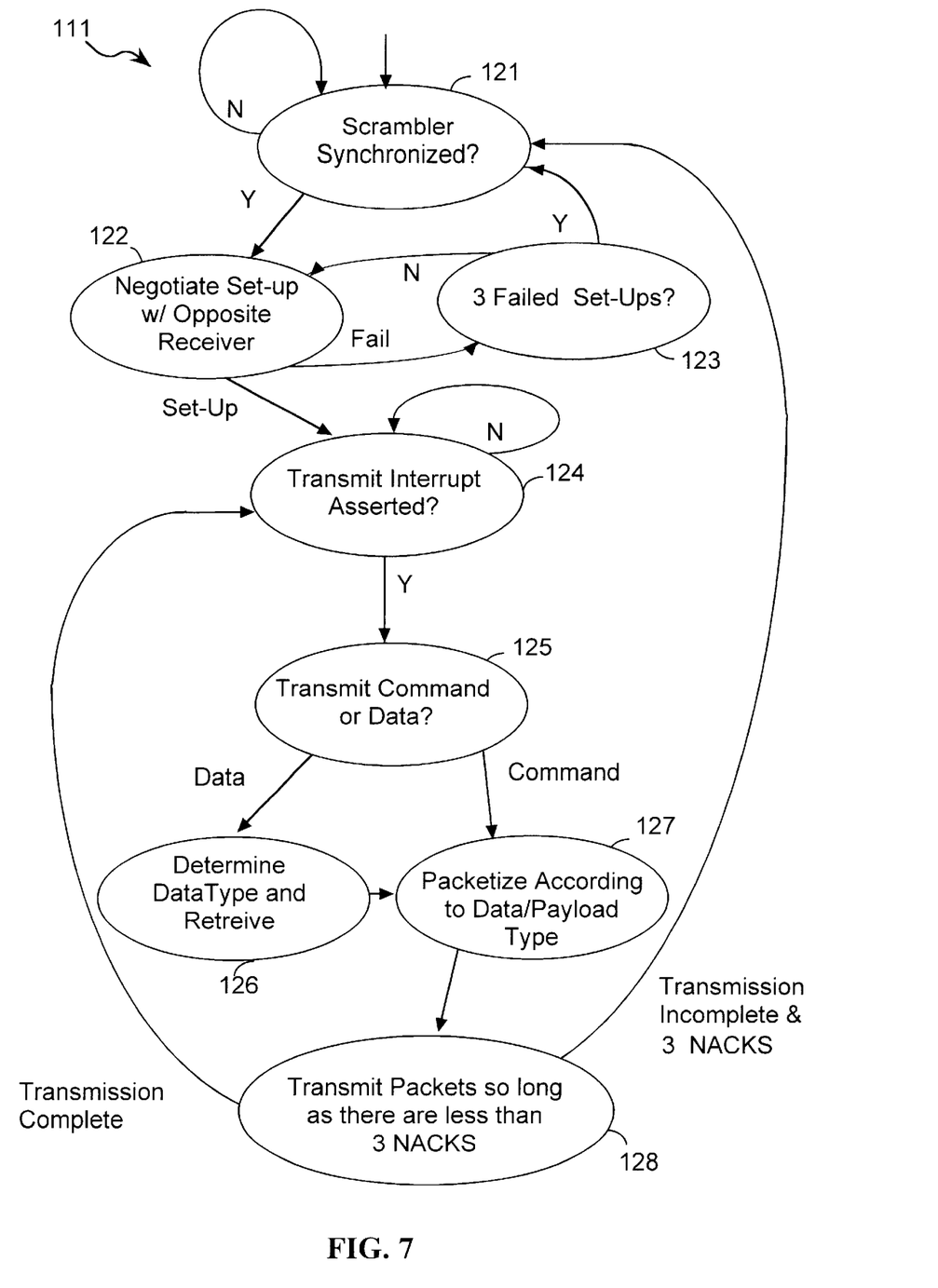
FIG. 7 is a state diagram of the Transmit Control State Machine of the Serial Transmitter.

Transmit Control State Machine 110 may be realized as a memory device or Programmable Logic Array (PLA) storing the States 111, which are illustrated in FIG. 7. Operation begins with State 121, during which Transmit Control State Machine 110 determines whether Scrambler 114 is synchronized with its counterpart in the Serial Receiver 64 at the opposite end of Serial Bus 56. Until Scrambler 114 is synchronized with its counterpart, Serial Receiver 64 will be unable to recover the data transmitted to it. Once Scrambler 114 is synchronized, Transmit Control State Machine 110 advances to State 122 from State 121.

With State 122 Transmit Control State Machine 110 begins negotiating transmission set-up with the Serial Receiver 64 at the opposite end of Serial Bus 56. Transmit Control State Machine 110 makes three efforts to successfully set-up transmission. If all three efforts fail, Transmit Control State Machine 110 returns to State 121 from State 123 to synchronize Scrambler 114 again. On the other hand, Transmit Control State Machine 110 advances to State 124 once set-up has been completed.

During State 124 Transmit Control State Machine 110 examines the TX Interrupt from ATS Machine 83 to determine whether Task File 72 contains data that should be transmitted. If the TX Interrupt signal has been asserted, Transmit Control State Machine 110 branches from State 124 to State 125 to begin the packetization process. First, during State 125 Transmit Control State Machine 110 determines whether the payload represents a command or data based upon information provided by ATS Machine 83. If the payload is data, then during State 126 Transmit Control State Machine 110 retrieves the data based upon its data type. PIO data is retrieved from Task File Data Registers, while control data is retrieved from the Control Block Registers of Task File 72. Transmit Control State Machine 110 uses MUX 112 to access payload data from Direct Memory Access (DMA) data on line 91 and Peripheral Input/Output (PIO) data on line 93. Second, during State 127 Transmit Control State Machine 110 packetizes the data according to the payload type. During this state, Packetizer 102 (see FIG. 6) generates data packets under the control of Transmit Control State Machine 110. Packetization involves generating a header, PID and Cyclical Redundancy Check (CRC), which are concatenated with the payload. For data packets, the headers indicate whether the data came from the Control Block Registers of Task File 72 or whether it is PIO Data from Task File Data Registers. Command packets are distinguished from data packets by their headers. Packetization complete, Transmit Control State Machine 110 advances to State 128.

During State 128 Transmit Control State Machine 110 transmits to Serial Bus 56 the serialized LVDS, encoded, scrambled packets for so long as the total number of unreceived packets, indicated by NACKs, is less than 3, or until all of the packets of the message have been transmitted. If 3 NACKs are received before the entire message is transmitted, Transmit Control State Machine 110 returns to State 121. On the other hand, if the entire message is successfully transmitted, Transmit Control State Machine 110 returns to State 124 to await initiation of another transmission.

Referring again to FIG. 6, Packetizer 102 accepts the payload data coupled to it by MUX 112 and generates a packet, or packets. Circuitry for performing this function is well known. Transmit Control State Machine 110 indicates to Packetizer 102 the appropriate packet type and PID via control signals on line 103. The different Task File data types are indicated via information included in the packet header. Packetizer 102 transmits the signals representing the packets to Logical XOR 116 on lines 104.

To prevent generation of repetitive sequences of identical bytes, packets are scrambled prior to transmission over Serial Bus 56. Logical XOR produces the scrambled packets performing an exclusive OR operation on each byte of a packet using 8 bit scramble sequences provided by Scrambler 114 on lines 115. Logical XOR 116 outputs the signals representing the scrambled packets, a byte at a time, on lines 117.

Scrambler 114 generates the 8 bit scramble sequences used to scramble packets. Scrambler 114 generates these sequences almost entirely without input from other circuits. Its only input comes from Transmit Control State Machine 110 at power-up, a starting non-zero value, x. Starting with this first value of x, Scrambler 114 continuously generates a scramble polynomial, G(x). An example of a possible relationship between x and G(x) is given by:

$$G(x)=x^{11}+x^9+1. \tag{1}$$

The scramble sequence output by Scrambler 114 at any point in time can be represented as:

$$Scr(k)=Scr(k-9)XOR\ Scr(k-11); \tag{2}$$

where:

Scr(k) denotes the Scrambler output at k; and k is an integer.

Let us denote each bit of a byte of unencoded, unscrambled data from Packetizer 102 using the symbols H-A, where bit H is the most significant bit and bit A the least significant. Similarly, let us denote each bit of a byte of unencoded, scrambled data output by XOR 116 as H'-A', where bit H is the most significant bit and bit A' is the least significant bit. The relationship between the unencoded, unscrambled data and the unencoded, scrambled data is given by:

$$[H',\ G',\ F',\ E',\ D',\ C',\ B',\ A']=[H,\ G,\ F,\ E,\ D,\ C,\ B,\ A]XOR\ [Scr(k:k+7)]; \tag{3}$$

where Scr(k−1) is the output bit from Scrambler 114 used to scramble the least significant bit of the immediately preceding sequence of data bytes. For example, in a sequence of data, the scrambled data byes would be calculated as follows:

$$1^{st} \text{ scrambled data byte} = [H, G, F, E, D, C, B, A] XOR$$
$$[Scr(k:k+7)] \quad (4)$$

$$2^{nd} \text{ scrambled data byte} = [H, G, F, E, D, C, B, A] XOR$$
$$[Scr(k+8:k+15)]. \quad (5)$$

Encoder 118 takes the scrambled packets and modulates them to produce signals with the properties required for transmission by Federal Standards: D.C. free, run-length limited, etc. Encoder 118 does so by converting the 8-bit words into 10-bit words with the required properties. Thus, Encoder 118 is called an "8B/10B Modulator". Franaszek et al describe an 8B/10B Modulator in U.S. Pat. No. 4,486,739, issued Dec. 4, 1984, entitled "Byte Oriented DC Balanced (0,4) 8B/10B Partitioned Block Transmission Code." Encoder 118 operates synchronously using a clock signal provided by Phase Locked Loop (PLL) 120. Encoder 118 couples the signals representing the modulated, scrambled packets to TTL-LVDS Serializer 104 on lines 119.

Prior to TTL-LVDS Serializer 104 signals have been parallel to one another, single-ended and used TTL voltage levels. TTL-LVDS Serializer 104 converts the signals it receives on line 119 to a set of serial, isochronous, differential signals using LVDS voltage levels, which are coupled to Serial Bus 56. A number of different TTL-LVDS Serializers are commercially available.

C. The Serial Receiver

Figure 8:
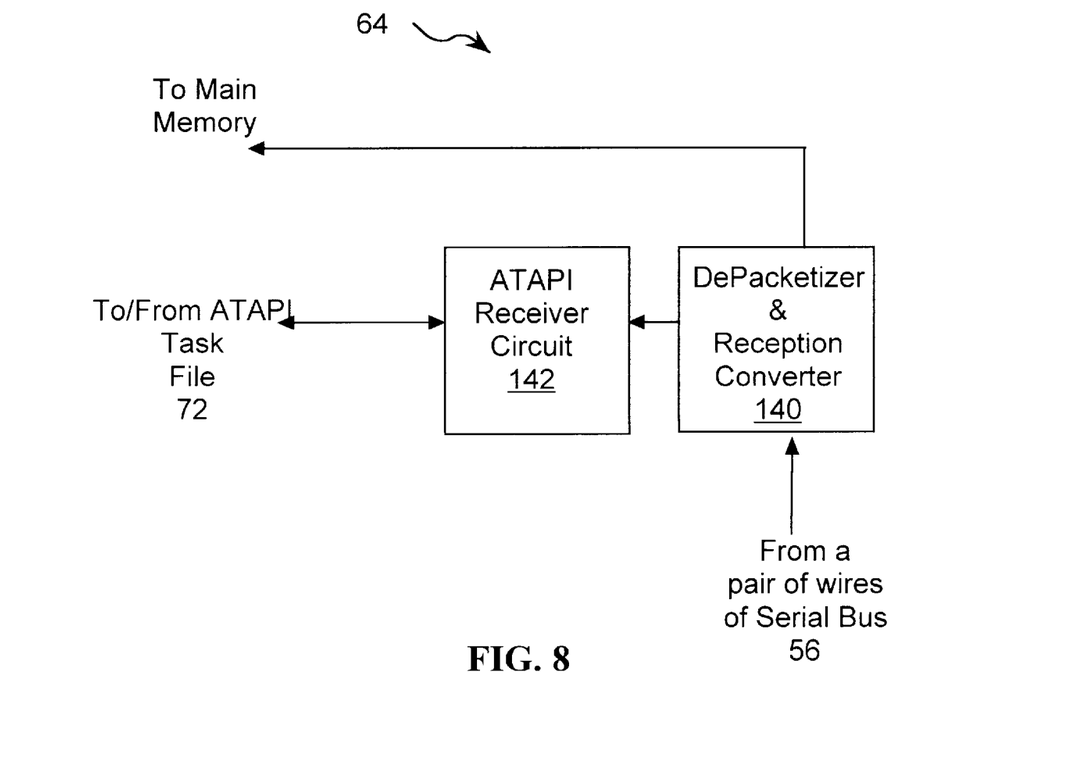
FIG. 8 is a block diagram of a Serial Receiver of the Serial Bus Interface.

FIG. 8 illustrates in block diagram form an instance of Serial Receiver 64, which includes DePacketizer & Reception (D&R) Converter 140 and ATAPI Receiver Circuit 142. D&R Converter 140 receives from Serial Bus 56 serial, LVDS signals that represent encoded and scrambled packets of data. D&R Converter 140 first "de-serializes" the signals, converting them to parallel, single-ended signals using TTL voltage levels, which still represent encoded and scrambled packets. After de-serialization, D&R Converter 140 decodes and unscrambles the packets. Finally, D&R Converter decomposes the packets to obtain their payload, which is coupled to ATAPI Receiver_Circuit 142. ATAPI Receiver Circuit 142 examines the packet payload(s) to determine the payload type and then, based upon that type, places the payload in the appropriate Task File Register.

C1. The D&R Converter

Figure 9:
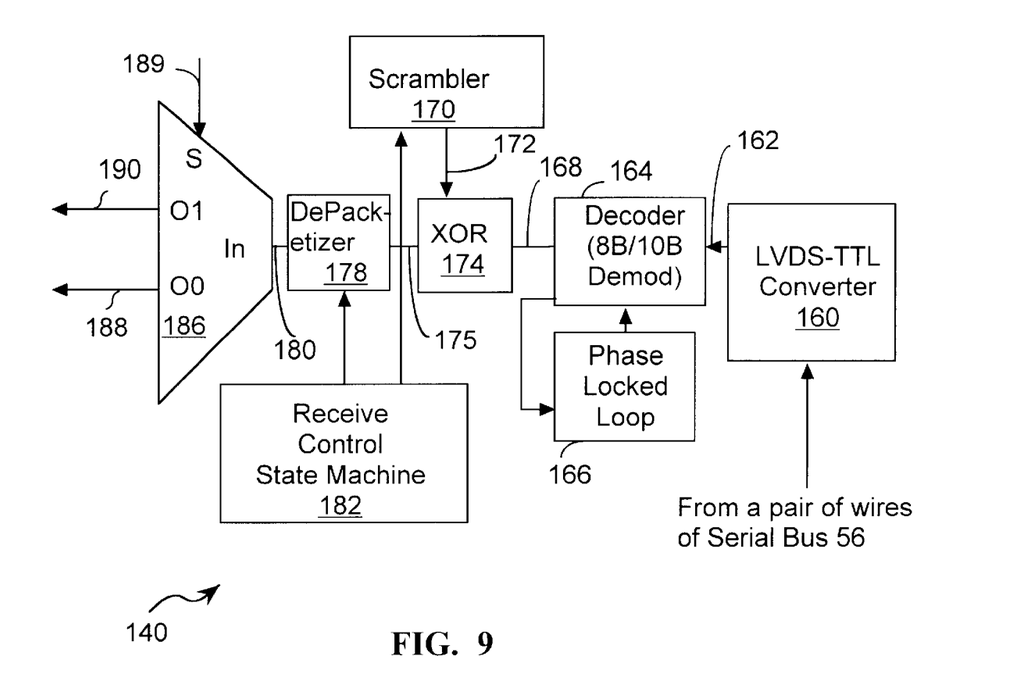
FIG. 9 is a block diagram of DePacketizer & Reception Converter of the Serial Receiver.

FIG. 9 illustrates in block diagram form D&R Converter 140, which includes LVDS-TTL Deserializer 160 and DePacketizer 178. Many circuits within D&R Converter 140 are not necessary to practice the present invention, but are required to comply with standards set by the Federal Communications Commission (FCC). Such circuits include Scrambler 170, Logical XOR Circuit 174, Decoder 164 and Phase Locked Loop (PLL) 166.

LVDS-TTL Deserializer 160 receives encoded, scrambled packets from Serial Bus 56. The signals from Serial Bus 56 are isochronous, serial and use LVDS. LVDS-TTL Deserializer 160 converts input signals into isochronous, single-ended, parallel signals using TTL voltage levels, which represent encoded, scrambled packets. A number of different TTL-LVDS Deserializers are commercially available. LVDS-TTL Deserializer 160 couples its output signals to Decoder 164 on line 162.

Decoder 164 converts the signals representing encoded, scrambled packets into decoded, scrambled packets. Decoder 164 also synchronizes its output signals to the clock recovered by PLL 166. Decoder 164 decodes the encoded, scrambled packets using a 10B/8B demodulator like that described in U.S. Pat. No. 4,486,739 to Franaszek entitled "Byte Oriented DC Balanced (0,4) 8B/10B Partitioned Block Transmission Code," issued Dec. 4, 1984. Decoder 164 couples the signals representing the decoded, scrambled packets to Logical XOR 174 on line 168.

Receive Control State Machine 182 controls and coordinates the descrambling of packets and the retrieval of the header and payload data of those packets. Receive Control State Machine 182 first determines whether that Scrambler 170 is synchronized with the Transmission Scrambler on the other end of Serial Bus 56. Packets cannot be successfully descrambled until this occurs. Once the two Scramblers are synchronized, Receiver Control State Machine 182 allows Scrambler 170 to begin outputting scramble sequences to Logical XOR 174 on line 172. Scrambler 170 is preferably an instance of Scrambler 114, discussed above with respect to FIG. 6. Logical XOR 174 unscrambles the packets by performing an XOR operation on the signals representing the scrambled packets using the scramble sequences provided on line 172.

DePacketizer 178 takes the unscrambled packets on line 175 and disassembles them under the control of Receive Control State Machine 182. DePacketizer 178 disassembles each packet into a Packet ID, header, payload and CRC. If the CRC indicates that the packet is good, then DePacketizer 178 couples the payload to Demultiplexer (DeMux) 186 on lines 180.

DeMux 186 routes the packet payloads to either registers of Task File 72 via lines 188 or to main memory via lines 190. ARS Machine 142 controls the routing of payloads by DeMux 186 via the Select Signal on line 189.

Figure 10:
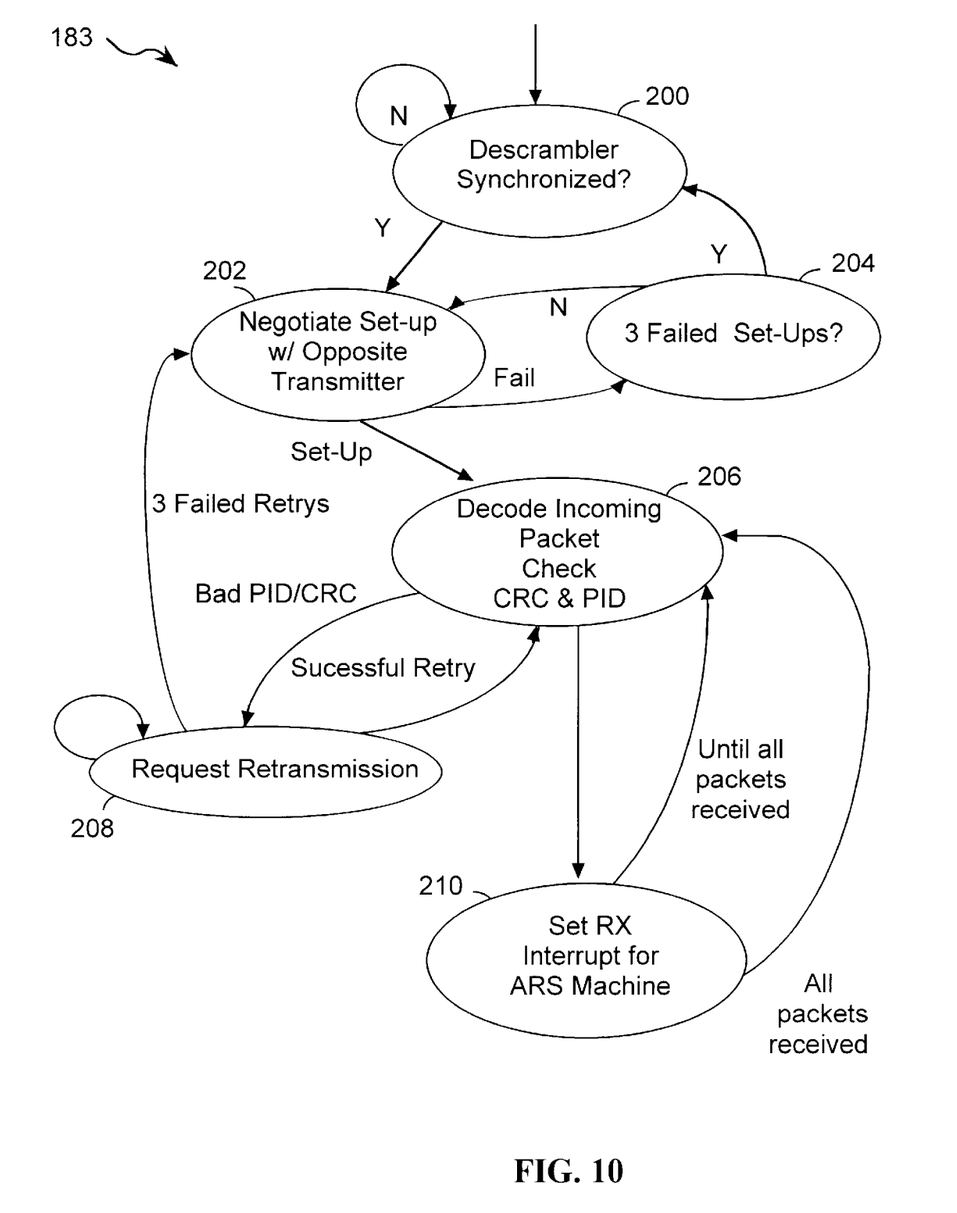
FIG. 10 is a state diagram of the Receive Control State Machine of the Serial Receiver.

In one embodiment, Receive Control State Machine 182 is realized as a memory device or PLA storing States 183, which are illustrated in FIG. 10. Operation begins with State 200, during which Receive Control State Machine 182 determines whether Scrambler 170 is synchronized with its counterpart. When the two Scramblers are synchronized, Receive Control State Machine 182 advances to State 202.

Receive Control State Machine 182 now negotiates packet transmission setup with the Transmitter at the opposite end of Serial Bus 56. Receive Control State Machine 182 makes at least three attempts to negotiate set-up. If all three efforts fail, Receive Control State Machine 182 returns to State 200 from State 204, to re-synchronize Scrambler 170. Once packet set-up has been successfully negotiated, Receive Control State Machine 182 advances to State 206 from State 202.

With State 206 Receive Control State Machine 182 begins the process of disassembling and examining individual packets. In particular, Receive Control State Machine 182 examines the PID to determine whether it is valid and examines the packet's CRC to determine whether the payload is error free. Receive Control State Machine 182 deems the packet to be "bad" if the PID is invalid or the CRC is incorrect. In response to a bad packet, Receive Control State Machine 182 branches to State 208 to request retransmission of the packet. At least three attempts are made to receive a valid version of the packet. If all three efforts fail, Receive Control State Machine 182 returns to State 202 from State 208. On the other hand, in response to receipt of a valid packet, Receive Control State Machine 182 advances to State 210 from State 206.

During State 210 Receive Control Machine 182 indicates to ARS Machine 142 that a payload is available and should be processed by asserting the RX Interrupt bit on the ATAPI Task File 72. For as long as packets continue to be received, Receive Control State Machine 182 returns to State 206 to evaluate the packets. Once the last packet of a message has been analyzed, Receive Control State Machine 182 branches to State 206 from State 210, to await the first packet of the next message.

C2. The ATAPI Receiver Circuit

Figure 11:
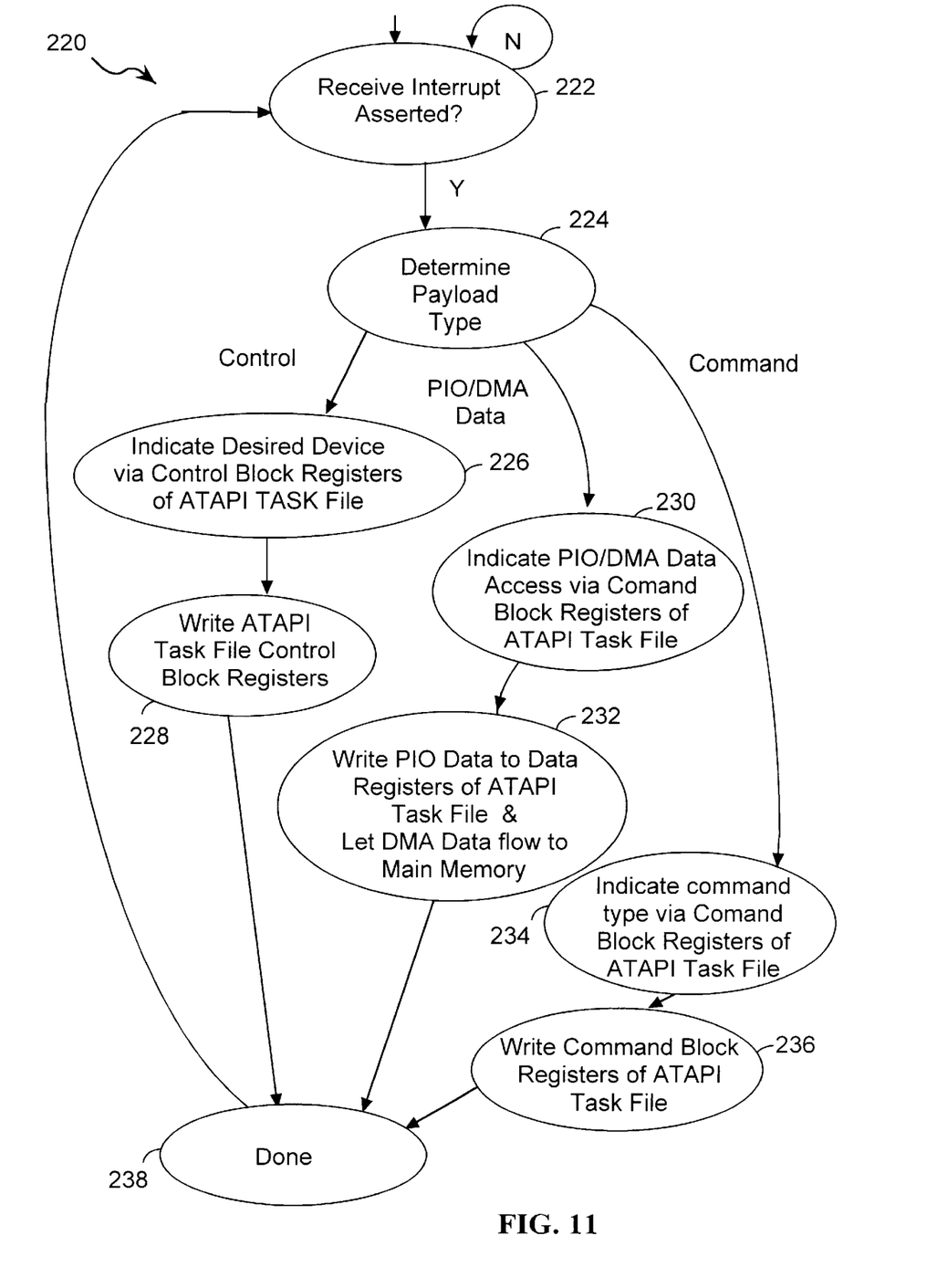
FIG. 11 is a state diagram of the ATAPI Receive State Machine of the Serial Receiver.

In one embodiment ATAPI Receiver Circuit 142 is realized as a state machine, referred to herein as ATAPI Receiver State (ARS) Machine 142. ARS Machine 142 is preferably implemented using a memory device or PLA storing States 220. FIG. 11 illustrates the States 220 of ARS Machine 142. Operation begins with State 222, during which ARS Machine 142 determines whether the RX Interrupt bit of Task File 72 has been asserted. Until then, ARS Machine 142 remains in State 222. Assertion of the RX Interrupt bit indicates that a valid packet requires attention. In response, ARS Machine 142 branches to State 224 from State 222.

During State 224 ARS Machine 142 determines the type of data the payload represents. ARS Machine 142 makes this determination by examining the header signals on lines 180. If the header indicates that the packet payload represents ATAPI control data, ARS Machine 142 branches to State 226 from State 224. During State 226 ARS Machine 142 addresses the ATAPI Task File Ports required to enable the payload data to be written into the Control Block Registers. For control data this is done by programming CS1FX=0, CS3FX=1 and appropriately programming DA2-DA0 to address the desired Control Block Register. ARS Machine 142 advances to State 228 from State 226. Having programmed Task File 72 in a manner that permits the Control Block Registers to be written, during State 228 ARS Machine 142 writes the payload data on lines 188 into appropriate Control Block Register. Having placed the payload data in the appropriate register within Task File 72, ARS Machine 142 advances to State 238.

ARS Machine 142 branches to State 230 from State 224 if the header indicates that the packet payload represents Programmed Input/Output (PIO) data or Direct Memory Access (DMA) data. During State 230 for PIO data ARS Machine 142 programs the ATAPI Task File Ports so the packet payload can be written directly to the Task File Data Registers. This is done by programming CS1FX=1, CS3FX=0, although DA2-DA0 must be programmed to $000_b$. Afterward, during State 232 ARS Machine 142 writes the PIO data on line 190 directly into the Task File Data Registers. On the other hand, for DMA data during State 230 ARS Machine 142 programs the ATAPI Task File Ports so that data can flow directly to Main Memory. DMA data then flows directly to Main Memory during State 232.

ARS Machine 142 branches from State 224 to State 234 if the header indicates that the packet payload represents command block data. During State 234 ARS Machine 142 programs the ATAPI Task File Ports so that the Command Block Registers can be written. In particular, this is done by programming CS1FX=1, CS3FX=0 and appropriately programming DA2-DA0 to address the desired Command Block Registers. Afterward, in State 236 ARS Machine 142 writes the payload data on lines 188 into the appropriate Command Block Register. ARS Machine 142 then branches to State 238 from State 236.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A receiver interface for interfacing with an Advanced Technology Attachment Packet Interface (ATAPI) in a first device, the receiver interface comprising:

a. a converter converting a first set of signals from a serial bus into a second set of signals, the first set of signals being serial to one another and using low-voltage, differential signaling (LVDS), the first set of signals being adapted to be received on fewer lines and at a faster data rate than possible with an Integrated Disc Electronics (IDE) Bus, the second set of signals being serial to another, using TTL voltage levels, and single-ended signaling, the second set of signals using a packet format to represent a packet;

b. a depacketizing circuit disassembling the packet represented by the second set of signals to generate a third set of signals, the third set of signals being parallel to one another and using TTL, single-ended signaling, the third set of signals representing a payload of the packet; and c. an ATAPI receiver circuit for storing a fourth set of signals at a location within the ATAPI in response to the third set of signals, the fourth set of signals representing a portion of the payload of the packet.

2. The receiver interface of claim 1 wherein the ATAPI receiver circuit comprises an ATAPI receiver state machine.

3. The receiver interface of claim 2 wherein the ATAPI receiver state machine comprises a memory for storing data representing receiver states.

4. The receiver interface of claim 3 wherein the receiver state machine is configured to include:

a first state determining a type of the packet;

a second state identifying a selected register of the ATAPI based upon the packet type; and a third state writing the payload of the packet into the selected register.

5. The receiver interface of claim 1 wherein the converter includes only two data input lines to receive the first set of signals.

6. The receiver interface of claim 1 wherein the converter supports a transfer rate of 100 Mbytes/sec.

7. The receiver interface of claim 1 wherein the converter supports a transfer rate greater than 66 Mbytes/sec.

8. A receiver interface for interfacing with an Advanced Technology Attachment Packet Interface (ATAPI) in a first device, the receiver interface comprising:

a. a converter converting a first set of signals from a serial bus into a second set of signals, the first set of signals being serial to one another and using low-voltage, differential signaling (LVDS), the first set of signals being adapted to be received on fewer lines and at a faster data rate than possible with an Integrated Disc Electronics (IDE) Bus, the second set of signals being serial to another, using TTL voltage levels, and single-ended signaling, the second set of signals using a packet format to represent a packet;

b. a depacketizing circuit disassembling the packet represented by the second set of signals to generate a third set of signals, the third set of signals being parallel to one another and using TTL, single-ended signaling, the third set of signals representing a payload of the packet; and c. an ATAPI receiver circuit for storing a fourth set of signals at a location within the ATAPI in response to the third set of signals, the fourth set of signals representing a portion of the payload of the packet;

wherein the converter supports a transfer rate at least twice that of the IDE bus.

9. The receiver interface of claim 8 wherein the converter includes two data input lines to receive the first set of signals.

10. The receiver interface of claim 8 wherein the converter supports a transfer rate of 100 Mbytes/sec.

11. The receiver interface of claim 8 wherein the converter supports a transfer rate greater than 66 Mbytes/sec.

12. A method of interfacing between a serial bus and a first device including an Advanced Technology Attachment Packet Interface (ATAPI), the method comprising:

a. receiving a first set of signals from the serial bus, the first set of signals being serial to one another and using low-voltage, differential signaling (LVDS), the first set of signals being received at a transfer rate that can be increased without increasing a number of lines of the serial bus;

b. generating a second set of signals from the first set of signals, the second set of signals representing a packet, the second set of signals being parallel to one another and using Transistor-Transistor Logic (TTL) voltage levels, single-ended signaling;

c. disassembling the packet represented by the second set of signals to generate a third set of signals, the third set of signals representing a payload of the packet, the third set of signals being parallel to one another and using TTL voltage levels, single-ended signaling;

d. determining a payload type using the third set of signals and generating a fourth set of signals to represent the payload type;

e. addressing a first register of a task file of the ATAPI using the fourth set of signals; and f. coupling a fifth set of signals to the first register of the task file, the fifth set of signals representing a portion of the payload, the fifth set of signals being parallel to one another and using TTL voltage level, single-ended signaling.

13. The method of claim 12 wherein the first set of signals is received at a rate greater than 100 Mbytes/sec.

14. The method of claim 12 wherein the first set of signals is received at a rate greater than 66 Mbytes/sec.

15. The method of claim 12 wherein the first set of signals are received using a number of data lines that is less than twenty.

16. The method of claim 9, wherein the first set of signals are received using only two data lines.

17. A receiver interface for interfacing with an Advanced Technology Attachment Packet Interface (ATAPI) in a first device, the receiver interface comprising:

a converter converting a first serial, packetized set of signals received from a bus into a second parallel set of signals; and an ATAPI receiver circuit for transferring the second parallel set of signals to the ATAPI;

wherein the first serial, packetized set of signals are adapted to be received on fewer lines and at a faster data rate than possible with an Integrated Disc Electronics (IDE) Bus.

18. The receiver interface of claim 17, wherein the second parallel set of signals represent a payload of the first serial, packetized set of signals.

19. The receiver interface of claim 17, wherein the second parallel set of signals are packetized, and further including a depacketizing circuit which disassembles the second parallel, packetized set of signals to generate a third parallel set of signals representing a payload of the second parallel, packetized set of signals.

20. The receiver interface of claim 17, wherein the first serial, packetized set of signals use Low-Voltage Differential Signaling (LVDS) and the second parallel set of signals use Transistor-Transistor Logic (TTL) single-ended signaling.

21. The receiver interface of claim 20, wherein the converter further converts the LVDS of the first serial, packetized set of signals to the TTL single-ended signaling of the second parallel set of signals.

22. The receiver interface of claim 17, wherein the bus includes only two data lines.

23. A receiver interface in a first device, the receiver interface comprising:

a serial interface to a bus;

a parallel interface to an Advanced Technology Attachment Packet Interface (ATAPI); and a converter which converts a first set of serial signals received from the serial interface to the bus into a second set of parallel signals to be transmitted over the parallel interface to the ATAPI.

24. The receiver interface of claim 23, wherein the first set of serial signals are received on fewer lines and at a faster data rate than possible with an Integrated Disc Electronics (IDE) Bus.

25. The receiver interface of claim 23, wherein the first set of serial signals are packetized, and further including a depacketizing circuit which disassembles the first set of packetized serial signals to obtain a representation of a payload of the first set of packetized serial signals.

26. The receiver interface of claim 25, wherein the converter uses the representation of the payload of the first set of packetized serial signals to convert the first set of packetized serial signals to the second set of parallel signals.

27. The receiver interface of claim 23, wherein the first set of serial signals use Low-Voltage Differential Signaling (LVDS) and the second set of parallel signals use Transistor-Transistor Logic (TTL) single-ended signaling.

28. The receiver interface of claim 23, wherein the bus includes only two data lines.

* * * * *